No. 830,549. PATENTED SEPT. 11, 1906.
E. A. WILCOX.
TOOL FOR ATTACHING HOSE TO COUPLINGS.
APPLICATION FILED MAY 21, 1906.
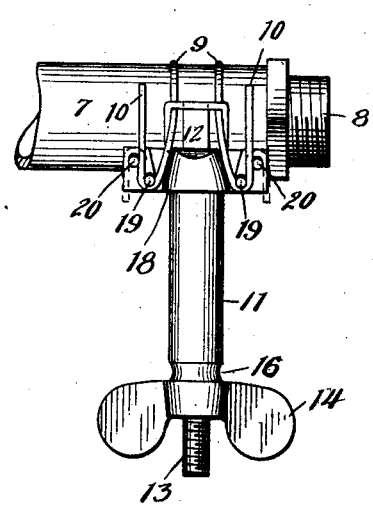
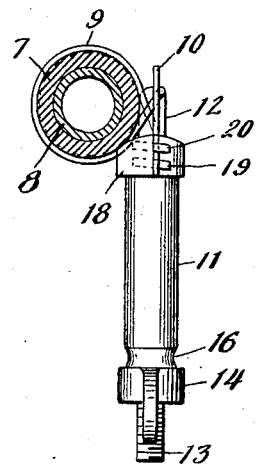
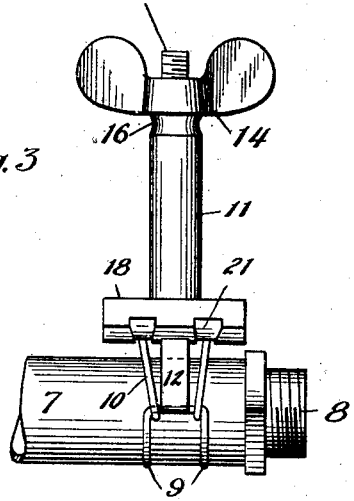
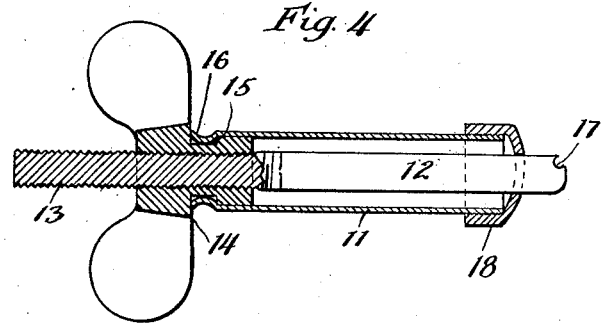
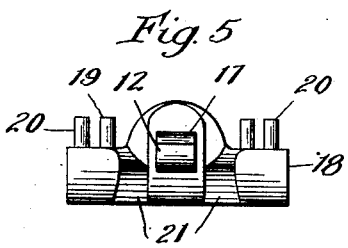
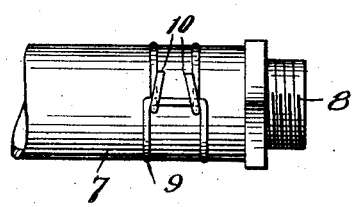
Witnesses
Wm. Geiger
Inventor:
Elmer A. Wilcox
By Munday Evarts & Adcock
Attorneys
THE NORRIS PETERS CO., WASHINGTON, D. C.

UNITED STATES PATENT OFFICE.

ELMER A. WILCOX, OF CHICAGO, ILLINOIS.

TOOL FOR ATTACHING HOSE TO COUPLINGS.

No. 830,549.      Specification of Letters Patent.      Patented Sept. 11, 1906.

Application filed May 21, 1906. Serial No. 318,105.

*To all whom it may concern:*

Be it known that I, ELMER A. WILCOX, a citizen of the United States, residing in Chicago, in the county of Cook and State of Illinois, have invented a new and useful Improvement in Tools for Attaching Hose to Couplings, &c., of which the following is a specification.

This invention relates to the construction of a tool to be used in attaching hose to couplings and pipes and is intended for use with fastenings made of wire.

The invention consists in the novel construction and combination of parts hereinafter set forth, and illustrated in the accompanying drawings, in which—

Figure 1 is a plan of the invention, showing it at the commencement of the operation of securing the hose. Fig. 2 is a side view showing the hose and coupling in section. Fig. 3 shows the tool at a subsequent stage of its operation. Fig. 4 is a longitudinal section of the tool. Fig. 5 is an end view, and Fig. 6 shows the hose and coupling after the completion of the attachment.

In said drawings, 7 represents the hose, and 8 a coupling to which the hose is being attached by means of a wire fastening 9. This wire fastening is bent in the customary manner into U form and placed around the hose, with its ends 10 passed through the loop formed at the doubled end of the fastener. My improved tool is then brought into use. This tool consists of a cylinder 11, a tightener 12 for tightening the wire fastener, such tightener being threaded at its outer end, as at 13, and a winged nut 14 engaging the said threaded portion of the tightener and locked in the cylinder in such manner as to permit it to turn without changing its position in the cylinder or becoming detached therefrom. This locking of the nut is desirably effected by recessing the outside of the nut, as shown at 15, and sinking or compressing that portion of the cylinder surrounding such recess 15 into the same, as plainly shown at 16 in Fig. 4. At its operating end the tightener is provided with a notch 17, adapted to engage the crotch or bent portion of the wire fastener. The cylinder 11 at the end which is placed against the hose is provided with a cross-head 18, threaded or otherwise secured upon the end of the cylinder and extending laterally in both directions therefrom. These lateral portions, which are shown at 18, are each provided with strong pins 19 and 20, around one or both of which the ends 10 of the wire may be wrapped in the manner indicated at Fig. 1 in full lines or in the manner indicated at the same figure in broken lines, the latter giving the greater resistance and enabling the tightening of the fastener to a greater degree than the method shown in full lines.

The tightener being positioned against the crotch of the wire is now tightened by turning the nut, forcing the tightener to advance and draw upon the wire until it becomes tight around the hose, the resistance necessary to permit this being obtained by the contact of the cross-head with the hose. After the tightener has been forced out to the desired extent the tool is reversed from the position of Fig. 1 to that of Fig. 3, turning upon the projecting point of the tightener in the operation. This bends the ends 10 around the crotch of the wire, so that they hold the tension then existing upon the fastener. The tool is now released from the wire by retracting the tightener and may then be removed, the excess wire in the points 10 being preferably cut off, and the fastening will then appear as in Fig. 6. The cross-head 18 is preferably recessed at each side, as plainly shown at 21 in Figs. 3 and 5, so as to give room to the wire and allow the flat or bearing portions of the cross-head to come in contact with the hose.

A tool constructed according to my invention is not only very efficient in operation, but it is also simple and durable.

I claim—

1. The tool for applying wire fasteners to hose, couplings, &c., consisting of a cylinder having a longitudinally-movable tightener therein, an operating device on the end of said tightener having a threaded engagement therewith, and locked to the cylinder, and a cross-head on the cylinder provided with pins for securing the ends of the fastener.

2. The tool for securing the wire fasteners of hose, couplings, &c., consisting of a hollow body, a tightener movable longitudinally in said body and adapted to engage the crotch of the wire fastener, said tightener being threaded at its outer end, an operating-nut threaded on said tightener and locked to said body and a cross-head on the operating end of the body having pins at each side of the body adapted to secure the free ends of the wire fastening.

3. The tool for securing the wire fasteners of hose, couplings, &c., consisting of a hollow body, a tightener movable longitudinally in said body and adapted to engage the crotch of the wire fastener, said tightener being
5 threaded at its outer end, an operating-nut threaded on said tightener and locked to said body and a cross-head on the operating end of the body having pins at each side of the body adapted to secure the free ends of the wire fastening, said cross-head being also 10 grooved to give room to the wire fastening and allow the cross-head to come in contact with the hose.

ELMER A. WILCOX.

Witnesses:
　PEARL ABRAMS,
　EDW. S. EVARTS.